United States Patent
Maggenti

(10) Patent No.: US 7,483,708 B2
(45) Date of Patent: Jan. 27, 2009

(54) APPARATUS AND METHOD FOR IDENTIFYING LAST SPEAKER IN A PUSH-TO-TALK SYSTEM

(76) Inventor: Mark Maggenti, 2480 Cordero Rd., Del Mar, CA (US) 92014

( * ) Notice: Subject to any disclaimer, the term of this patent is extended or adjusted under 35 U.S.C. 154(b) by 647 days.

(21) Appl. No.: 11/096,946

(22) Filed: Mar. 31, 2005

(65) Prior Publication Data

US 2006/0223459 A1 Oct. 5, 2006

(51) Int. Cl.
*H04B 7/00* (2006.01)

(52) U.S. Cl. ...................... 455/518; 455/90.2

(58) Field of Classification Search ............ 455/426.1, 455/518, 553.1, 90.2, 415, 566
See application file for complete search history.

(56) References Cited

U.S. PATENT DOCUMENTS

| | | | | |
|---|---|---|---|---|
| 5,530,916 | A * | 6/1996 | Schultz ..................... | 455/518 |
| 5,870,149 | A * | 2/1999 | Comroe et al. ............ | 348/474 |
| 5,912,882 | A * | 6/1999 | Yafuso et al. ............. | 370/270 |
| 6,522,894 | B1 * | 2/2003 | Schmidt .................. | 455/552.1 |
| 6,650,827 | B1 * | 11/2003 | Ogikubo et al. ........... | 386/70 |
| 6,999,921 | B2 * | 2/2006 | Harris et al. .............. | 704/215 |
| 7,203,509 | B2 * | 4/2007 | Gottschalk et al. ........ | 455/518 |
| 7,283,833 | B2 * | 10/2007 | Fukui et al. .............. | 455/517 |
| 7,292,872 | B2 * | 11/2007 | Pantalone et al. .......... | 455/519 |
| 7,308,245 | B2 * | 12/2007 | Kakimoto et al. ......... | 455/343.4 |
| 2002/0132635 | A1 * | 9/2002 | Girard et al. ............. | 455/552 |
| 2003/0078064 | A1 * | 4/2003 | Chan ..................... | 455/514 |
| 2004/0022208 | A1 * | 2/2004 | Dahod et al. ............. | 370/328 |
| 2004/0224710 | A1 * | 11/2004 | Koskelainen et al. ....... | 455/518 |
| 2004/0225904 | A1 * | 11/2004 | Perez et al. .............. | 713/320 |
| 2004/0266468 | A1 * | 12/2004 | Brown et al. ............. | 455/518 |
| 2005/0075121 | A1 * | 4/2005 | Hasegawa ................ | 455/518 |
| 2005/0136883 | A1 * | 6/2005 | Esquivia-Lee et al. ..... | 455/347 |
| 2005/0143111 | A1 * | 6/2005 | Fitzpatrick et al. ........ | 455/518 |
| 2005/0176454 | A1 * | 8/2005 | Chakraborty et al. ...... | 455/518 |
| 2005/0272454 | A1 * | 12/2005 | Hiller et al. .............. | 455/518 |
| 2006/0003740 | A1 * | 1/2006 | Munje .................... | 455/412.1 |
| 2006/0019689 | A1 * | 1/2006 | Pantalone et al. .......... | 455/518 |
| 2006/0030347 | A1 * | 2/2006 | Biswaas .................. | 455/518 |
| 2006/0058012 | A1 * | 3/2006 | Caspi et al. .............. | 455/415 |
| 2006/0087982 | A1 * | 4/2006 | Kuure et al. .............. | 370/252 |
| 2006/0121923 | A1 * | 6/2006 | East ...................... | 455/518 |
| 2006/0121924 | A1 * | 6/2006 | Rengaraju et al. ......... | 455/518 |
| 2006/0121925 | A1 * | 6/2006 | Jung ..................... | 455/518 |
| 2006/0121926 | A1 * | 6/2006 | Joung .................... | 455/518 |
| 2006/0142036 | A1 * | 6/2006 | Lim ...................... | 455/518 |
| 2006/0205416 | A1 * | 9/2006 | Kayzar et al. ............ | 455/456.1 |
| 2006/0223459 | A1 * | 10/2006 | Maggenti ................ | 455/90.2 |
| 2006/0252442 | A1 * | 11/2006 | Nurmi .................... | 455/518 |
| 2007/0002836 | A1 * | 1/2007 | Lindner .................. | 370/352 |
| 2007/0021131 | A1 * | 1/2007 | Laumen et al. ........... | 455/518 |
| 2007/0037599 | A1 * | 2/2007 | Tillet et al. .............. | 455/521 |
| 2007/0042814 | A1 * | 2/2007 | Kakimoto et al. ......... | 455/574 |
| 2007/0117552 | A1 * | 5/2007 | Gobburu et al. .......... | 455/414.1 |

(Continued)

*Primary Examiner*—Matthew D. Anderson
*Assistant Examiner*—Hai V Nguyen
(74) *Attorney, Agent, or Firm*—John L. Ciccozzi; Raphael Freiwirth; Thomas R. Rouse

(57) ABSTRACT

An apparatus and method for displaying identity information of a last speaker in a push-to-talk (PTT) system. A wireless communication device receives PTT communications and identification information of PTT speakers from a remote server. The wireless communication device displays the identification information of at least the last speaker while playing the PTT communication from a current speaker.

28 Claims, 5 Drawing Sheets

U.S. PATENT DOCUMENTS

| | | | |
|---|---|---|---|
| 2007/0155415 A1* | 7/2007 | Sheehy et al. | 455/518 |
| 2007/0197248 A1* | 8/2007 | Reich et al. | 455/518 |
| 2007/0197250 A1* | 8/2007 | Kies et al. | 455/518 |
| 2007/0214217 A1* | 9/2007 | Ueno et al. | 709/204 |
| 2008/0021598 A1* | 1/2008 | Daude et al. | 701/1 |
| 2008/0026702 A1* | 1/2008 | Chakraborty et al. | 455/90.2 |
| 2008/0026703 A1* | 1/2008 | Chakraborty et al. | 455/90.2 |

* cited by examiner

APPARATUS AND METHOD FOR IDENTIFYING LAST SPEAKER IN A PUSH-TO-TALK SYSTEM

BACKGROUND OF THE INVENTION

1. Field of the Invention

The present invention generally relates to wireless telecommunications, and more specifically, relates to an apparatus and method for identifying last or previous talker in a push-to-talk system on a wireless network.

2. Description of the Related Art

Technology advancement has made mobile telephones or wireless communications devices cheap and affordable to almost everyone. As the wireless telephones are manufactured with greater processing ability and storage, they also become more versatile and incorporate many features including the direct radio communication capability between two or more individual handsets. This direct radio communication capability is commonly known as the push-to-talk (PTT) or "walkie-talkie" feature that allows a user with one handset to communicate with a predefined set of members of a group without dialing a destination telephone number.

In one type of a PTT system, a handset uses one single frequency for both upward and downward communications with a remote server, while in a normal wireless communication a wireless telephone uses two frequencies for communicating with the server, one for upward and one for downward communications. The PTT system requires the person who is speaking to press a button while talking and then release it when they are done. Any listener in the group can then press their button to respond. In this manner, the system can determine in which direction the signal should be traveling. When a user makes a call to a receiving party or a group of receiving parties using the PTT system, the user's handset first makes a request to a remote server. The remote server verifies that no other party is using the communication channel and the channel is available then assigns the channel to the user. The user's message is received by the server and the server duplicates the message for each and every receiving party. The server may not need to duplicate the message if it is capable of broadcasting the message to all receiving parties. After the message is transmitted to every receiving party, the channel is released and ready for use by other parties.

In another type of PTT system, cellular technology is utilized to connect the group of communication devices. Conversely, a normal "walkie-talkie" style two-way radio will only operate if the radios are within a certain distance of each other. Systems using the cellular telecommunications to implement the PTT feature can communicate anywhere within a service area specified by its service provider, typically a large urban area, or even nationally.

Generally, in a communication through the PTT feature, the identity of a speaker is not identified and the recipient must guess by the speaker's voice. And in PTT systems where the identity of a speaker is properly identified, the identity of a speaker is easily lost where many members participate in a PTT communication group and the identity of a speaker is quickly over written by the identity information of the next speaker. Therefore, the present invention is directed to a system that enables the identification of the last speaker in a PTT system.

SUMMARY OF THE INVENTION

The apparatus and method according to the invention enables identification of the last talker during a push-to-talk communication in a wireless telecommunication network. The method includes receiving a first identity information of a first speaker of a first PTT communication from a server, receiving a second PTT communication originated from a second speaker, playing the second PTT communication on a wireless communication device, and displaying the first identity information on the wireless communication device. The first identity information is received through the wireless telecommunication network. A sequence of previous identities of speakers can also be displayed.

In one embodiment, the invention is an apparatus for displaying the identity of the last (or previous) speaker in push-to-talk (PTT) communications on a wireless telecommunication network. The apparatus includes a transceiver, a display unit, a user interface unit, a push-to-talk interface, and a controller. The transceiver transmits and receives push-to-talk communications and identity information of PTT speakers from a remote server. The display unit displays identity information of a PTT speaker. The user interface unit plays PTT communications received from the remote speaker. The push-to-talk interface receives a push-to-talk request from a user. The controller instructs the display unit to display the identity information of a last PTT speaker while the user interface unit is playing a PTT communication from a current speaker.

The present apparatus and method are therefore advantageous as they enable a user to readily identify the identity of one or more previous talkers in a PTT system. Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "wireless handset," "handheld device," and "handset" are used interchangeably, and the term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

Figure 1:
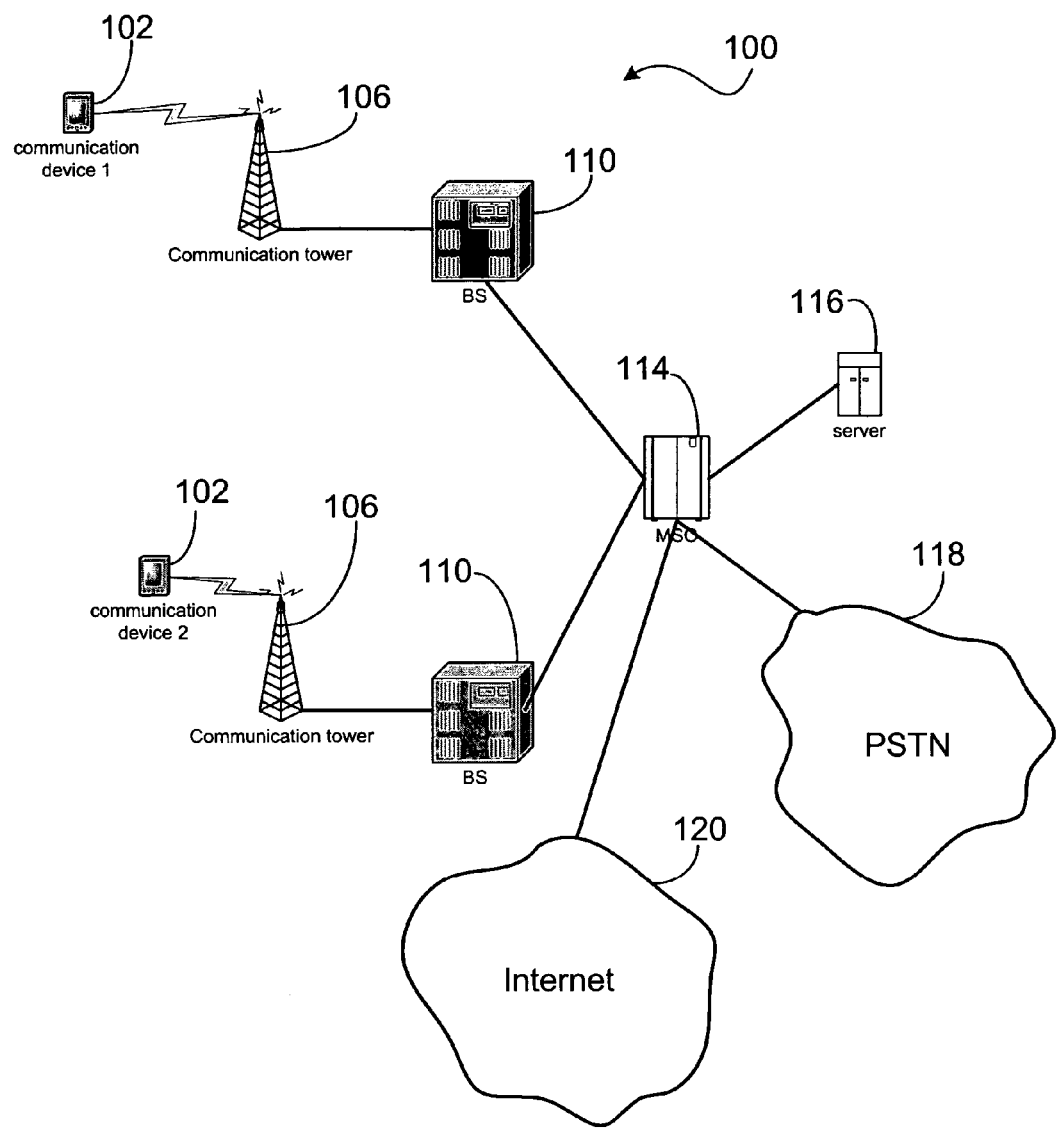
FIG. 1 is a wireless network architecture that supports a group of wireless devices for a push-to-talk communication.

In overview, the apparatus and method of the invention enables ready identification of a previous, or last, speaker in a PTT communication where there are many participants. FIG. 1 depicts one embodiment of a communication network 100 used according to the present invention. The communication network 100 includes one or more communication towers 106, each connected to a base station (BS) 110 and serving users with communication device 102. The communication device 102 can be a cellular telephone, pager, personal digital assistant (PDA), laptop computer, or other hand-held, stationary, or portable communication devices that support push-to-talk (PTT) communications. The commands and data input by each user are transmitted as digital data to a communication tower 106. The communication between a user using a communication device 102 and the communication tower 106 can be based on different technologies, such code division multiple access (CDMA), time division multiplexed access (TDMA), frequency division multiple access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120.

The MSC 114 may be connected to a server 116 that supports the PTT feature in the communications network 100. The server 116 includes an application that supports the PTT feature and is capable of establishing a PTT communication among members of a PTT communications group. The server 116 receives PTT communication from a PTT communication group member and forwards the PTT communication to all other group members along with the identification of the speaker. Optionally, the server 116 may be part of the MSC 114. It should be noted that the MSC 114 may not be needed in data-only cellular networks. In a data-only cellular network, data packets are received by the base stations, processed by packet data serving nodes (PDSN) and forwarded to other servers in the network.

Figure 2:
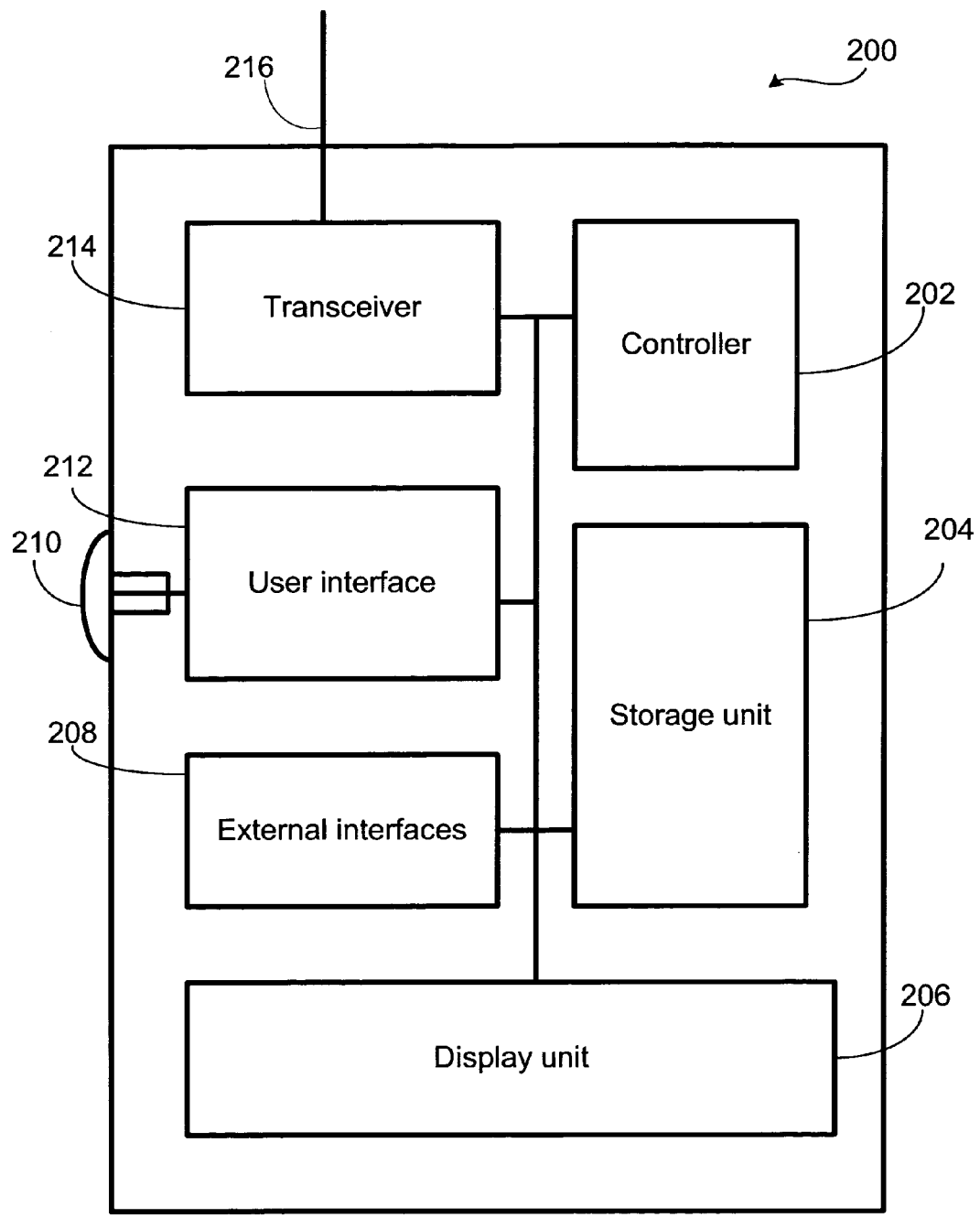
FIG. 2 is a block diagram of a wireless device that supports the identification of a previous speaker in a push-to-talk communication.

FIG. 2 illustrates a block diagram 200 of one embodiment of a wireless handset 102. The wireless handset 102 includes a controller 202, a storage unit 204, a display unit 206, an external interface unit 208, a user interface unit 212, a push-to-talk activation unit 210, a transceiver 214, and an antenna 216. The controller 202 can be hardware, software, or a combination thereof. The controller 202 oversees receiving and displaying of identity information of a PTT communication speaker. The controller 202 tracks the identities of a current speaker and a last speaker and uses a clock to track the duration of a PTT communication. The storage unit 204 may store a plurality of PTT communications groups, wherein each PTT communications group includes a list of members. The display unit 206 may display the information about a speaker's identity received from the server 116 or other digital information to the user. The display unit 206 may display more than one single line of information. The external interface unit 208 controls hardware, such as speaker, microphone, and display unit, used for communication with the user. The user interface unit 212 controls hardware, such as keypad and push-to-talk activation unit 210. The transceiver 214 transmits and receives radio signals to and from a communication tower 106. The controller 202 interprets commands and data received from the user and the communication network 100.

Figure 3:
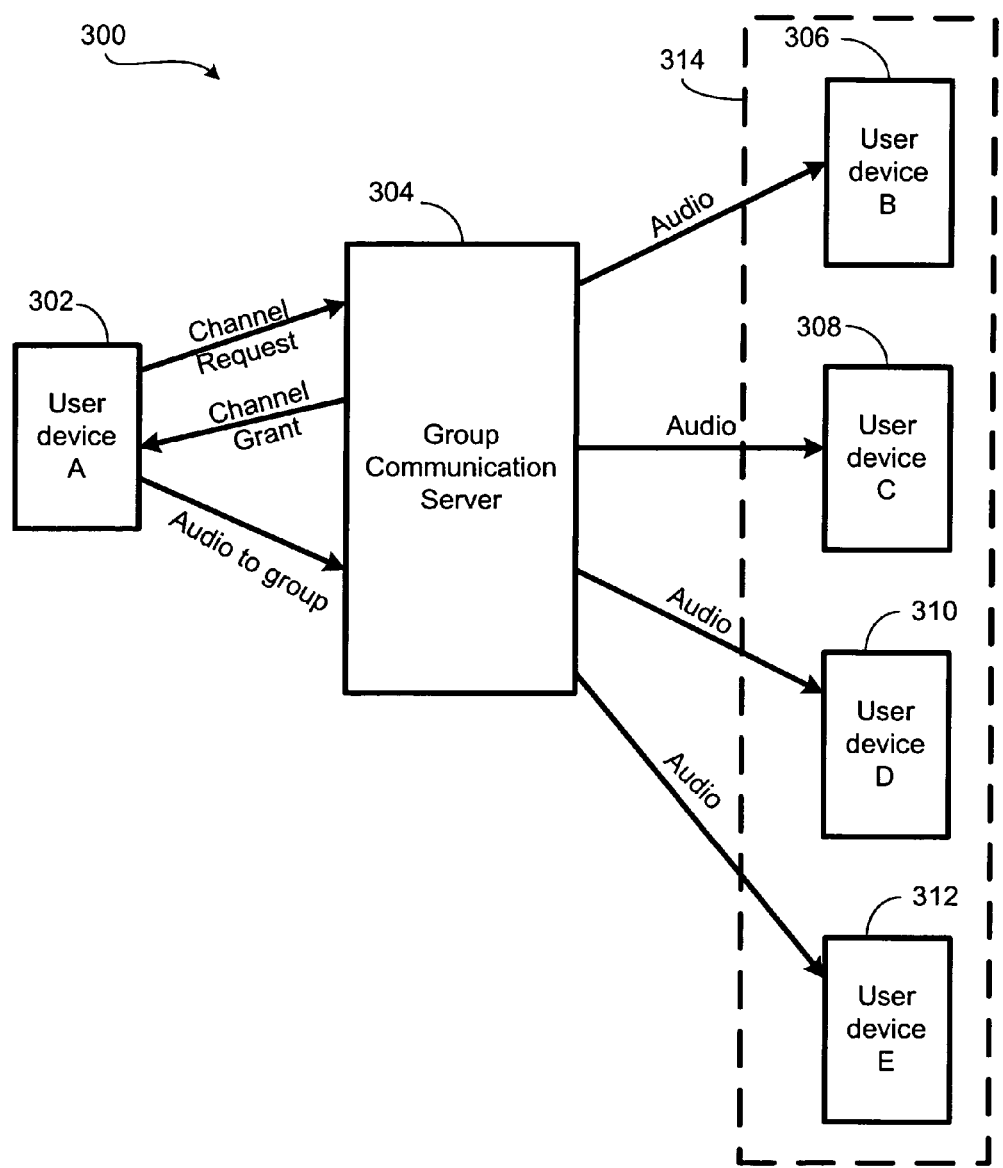
FIG. 3 is a diagram representing interactions between a server and remote wireless devices.

FIG. 3 is a diagram 300 representing interactions between the sewer (also) known as group communication server) and user devices during a PTT communication process. A communication does not occur between an initiating user device 302 and a server 304 until a user activates a PTT button. Generally, the user may staff a PTT communication with members of a predefined PTT group 314 or an ad-hoc PTT group. The wireless device sends a PTT communication channel request along with its identification to the server 304. Upon receiving the PTT communication channel request, the server 304 checks the availability of the PTT communication channel, and grants the PTT communication channel to the initiating user device 302 if the PTT communication channel is available. After the use of the PTT communication channel is granted to the initiating user device 302. The wireless device 302 then sends user audio to the server 302. Upon receiving the user audio and the user information, the server 304 identifies the members 306-312 of the PTT communication group 314 that the initiating user device 302 wants to send the audio message. The server 304 also replicates the audio message and sends them to each member 306-312 of the PTT communication group along with the originating user (speaker) identification information.

Figure 4:
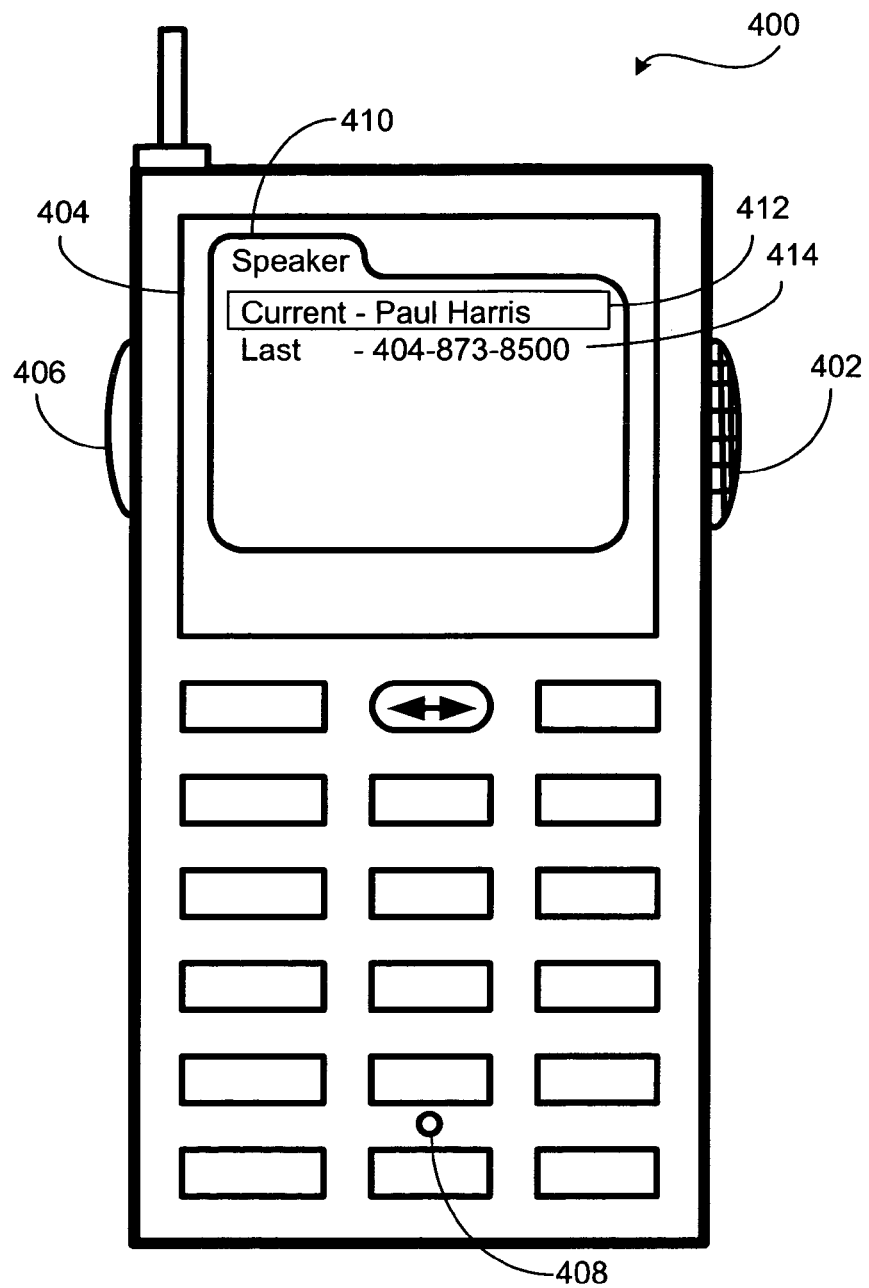
FIG. 4 is an illustration of a wireless device displaying speaker information.

FIG. 4 illustrates a wireless communication device 400 displaying a speaker list 410 on a display screen 404. A user may start a PTT communication by activating the PTT button 406. The user's audio is captured by the microphone 408 and transmitted to a server 116, and the audio received from the server 116 is played to the user through the speaker 402. The wireless communication device 400 also receives a PTT's speaker identity information from the server 116. The PTT speaker's identity is displayed on the speaker list 410. The speaker list 410 shown on the display screen 404 displays two entries 412 and 414. One entry 412 is marked as the current speaker and one entry 414 is marked as the last speaker. Alternatively, the display screen 404 may display only the identity of the last speaker or may also display a speaker list that encompasses all past speakers in an orderly form, wherein the current speaker is listed on the top followed by the last speaker, then followed by one before the last, and so forth. The length of display may be controlled by a display timer, which may be set by the user. Alternatively, the display may be recalled after the display period has ended. The user may recall the speaker list by activating a predefined key on the wireless communication device. Each entry may also have a time stamp attached indicating the time the PTT message is received. Those skilled in the art will appreciate different ways to display the speaker list.

In an alternative embodiment where the display screen 404 can display only one identity information at time, the identity information of a current speaker will not be displayed until the identity information of the previous speaker has been displayed for a predefined period. If the user has set the display time to be five seconds, the identity information of the current speaker will not be displayed until the identity information of the previous speaker has been displayed for five seconds. In such embodiment, it is preferable that the display of the previous identity information be clearly noted on the display to the user so that the user is readily aware that the identity information is from the previous speaker.

The speaker list may be cleared after the PTT communication is ended. One way to clear the speaker list is to use a timer. If there has no PTT communications among the members of the PTT group for a predefined time period, the wireless communication device 400 clears its speaker list. The timer may be set by the user on the wireless communication device. Alternatively, the timer may be set by the server.

Figure 5:
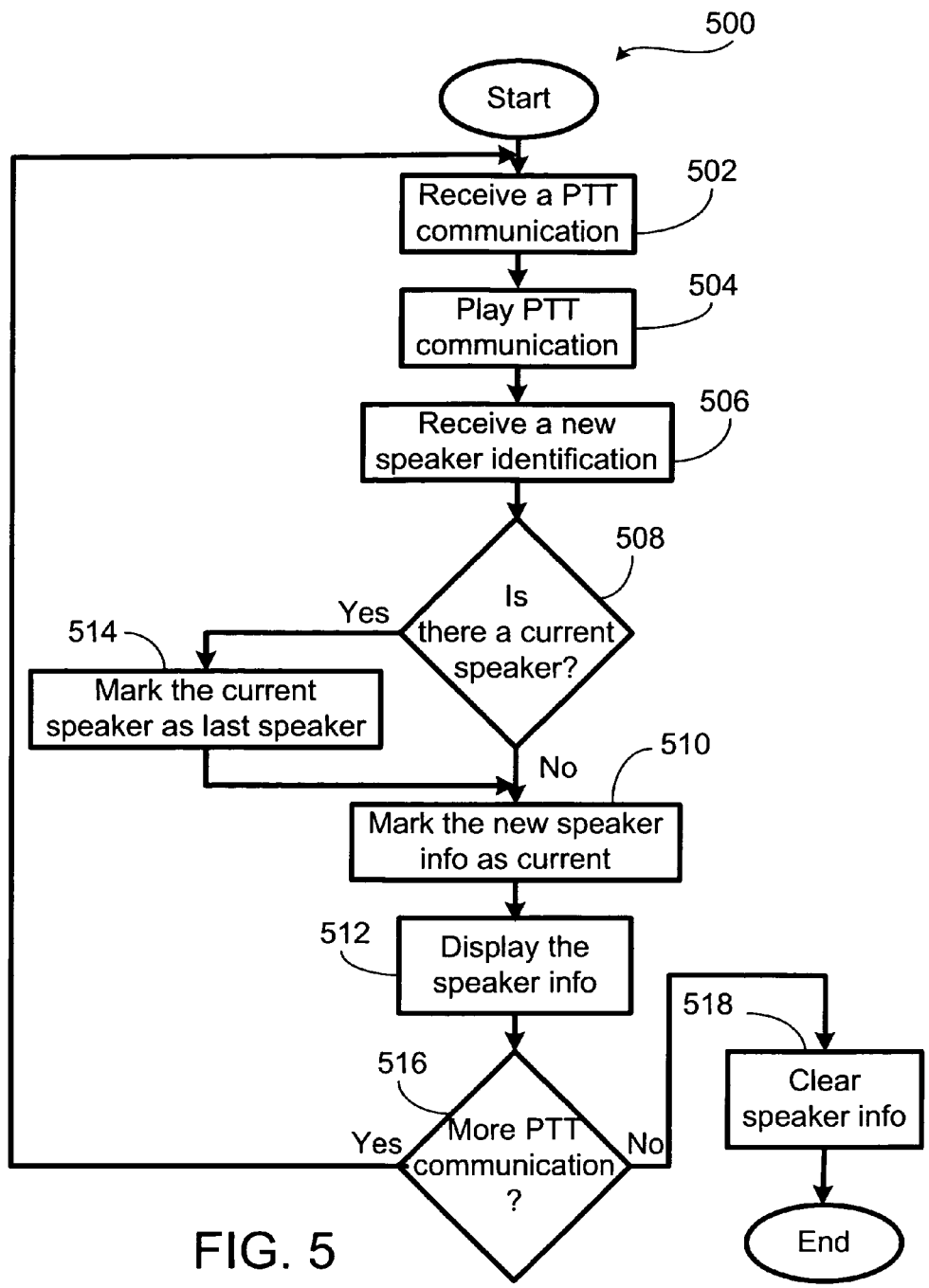
FIG. 5 is a flow chart for displaying speaker information on a wireless device.

FIG. 5 is a flow chart for a wireless device process 500. When a wireless communication device 102 receives a PTT communication, step 502, from a server 116, it plays the PTT communication, step 504, and it also receives speaker identification, step 506. The wireless communication device 102 checks if there is a current speaker assigned, step 508. The wireless communication device 102 tracks the identity of the current speaker during a PTT communication and the identity of the current speaker is cleared when the PTT communications in a PTT communication group are finished. The identity of the speaker may be tracked by the speaker list, which may be cleared as described previously. If no one is assigned as the current speaker (the communication received is the starting communication for a PTT communication among members of a PTT communication group), the wireless communication device 102 marks the identity of the speaker received as the current speaker, step 510, and displays the speaker list to the user, step 512. The speaker list is displayed for a predefined period of time.

If there is a current speaker (when the communication received is a follow up communication), the wireless communication device 102 changes the current speaker to last speaker, step 514, and then marks the identity received as the current speaker, step 510. After displaying the speaker list, the wireless communication device 102 checks whether there is more PTT communications, step 516, if there is, it proceeds to receive more PTT communications. If there is no more PTT communications, the wireless communication device 102 clears its speaker list, step 518.

The following is a description of one use scenario according to one embodiment of the invention. An engineer working on a construction site supervising a crew of 20 construction workers. Each worker is equipped with a wireless device that is capable of PTT communication and all workers including the engineer belong to a same PTT communication group. The engineer has set the display time on this wireless device to be five seconds. While at the construction site, the engineer uses the PTT communication to ask his two foremen James and Bill whether their crew have all show up for work on that day. James responded first stating that he is missing one worker and Bill responded next stating that he is missing two workers. The responses from James and Bill are broadcast one after another and neither stated their name. When the PTT communication from James is received by the engineer's wireless device, the wireless device checks that this is the first PTT communication received (the PTT communication broadcasted earlier by the engineer does not count because it is not sent back to the engineer's own device), so it sets the James as the current speaker and displays the speaker information. When the PTT communication from Bill is received by the engineer's wireless device, the wireless device sees that the current speaker is set to James, so it changes James to last speaker and set the current speaker to Bill. The wireless device then displays the speaker information where both James and Bill are listed and James is listed as the last speaker and Bill listed as the current speaker.

The engineer was distracted and did not catch who responded first and only noting the first responder is missing one worker and the second responder is missing two workers. In order to quickly recall the order of responses, the engineer activates a recall key and the speaker list is displayed on the display screen. He takes a look at the display on his wireless device and sees that James responded first followed by Bill and now he knows that James is missing one worker and Bill is missing two workers.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIG. 5, the method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for displaying on a wireless communication device the identity of a last speaker in push-to-talk (PTT) communications on a wireless telecommunication network, comprising the steps of:
   receiving at a wireless communication device a first identity information of a first speaker of a first PTT communication from a server, the first identity information being received through the wireless telecommunication network;
   receiving at the wireless communication device a second PTT communication originated from a second speaker;
   playing the second PTT communication on the wireless communication device; and displaying the first identity information on the wireless communication device.

2. The method of claim 1, further comprising the steps of receiving at the wireless communication device a second identity information of the second speaker; and
   after the first identity information is displayed for a predefined period, displaying the second identity information.

3. The method of claim 2, further comprising the steps of receiving from a user of the wireless communication device a predefined period of identity information display period; and
   storing the predefined period in the wireless communication device.

4. The method of claim 2, further comprising the step of retrieving the predefined period from the wireless communication device.

5. The method of claim 1, further comprising the step of activating a recall key to display the first identity information.

6. The method of claim 1, further comprising the step of, if a second identity information of the second speaker is received while the first identity information is displayed, displaying the first identity information and the second identity information on the wireless communication device.

7. The method of claim 6, further comprising the step of displaying an indicator identifying the first identity information as belonging to the first speaker.

8. The method of claim 6, further comprising the step of displaying an indicator identifying the second identity information as belonging to the second speaker.

9. An apparatus for displaying the identity of a last speaker in push-to-talk (PTT) communications on a wireless telecommunication network, comprising:
a transceiver for transmitting and receiving PTT communications from a remote server, the transceiver also receiving identity information of PTT speakers;
a display unit for displaying identity information of a PTT speaker; a user interface unit for playing PTT communications received from the remote speaker; a PTT interface for receiving a PTT request from a user; and a controller for instructing the display unit to display the identity information of the last PTT speaker while the user interface unit is playing a PTT communication from a current speaker.

10. The apparatus of claim 9, further comprising a storage unit for storing an indication of a user defined time period of a last speaker identification on the display unit.

11. The apparatus of claim 9, further comprising a recall key for recalling display of identity information.

12. The apparatus of claim 9, further comprising a display timer for controlling the display of identity information on the display unit.

13. The apparatus of claim 9, wherein the display unit is configured to simultaneously display identity information of more than one PTT speaker.

14. The apparatus of claim 9, wherein the display unit, when displaying identity information of two or more PTT speakers, is configured to indicate identity information of a last PTT speaker.

15. An apparatus for displaying the identity of a last speaker in push-to-talk (PTT) communications on a wireless telecommunication network, comprising:
means for receiving PTT communications and identity information of PTT speakers from a remote server;
means for displaying identity information of a PTT speaker; means for playing PTT communications received from the remote speaker; means for receiving a PTT request from a user; and
means for instructing the display unit to display the identity information of the last PTT speaker while the user interface unit is playing a PTT communication from a current speaker.

16. The apparatus of claim 15, further comprising means for storing an indication of a user defined time period of last speaker identification on the display unit.

17. The apparatus of claim 15, further comprising means for recalling the display of identity information.

18. The apparatus of claim 15, further comprising means for controlling the duration of display of identity information on the display unit.

19. The apparatus of claim 15, wherein the means for displaying identity information is configured to simultaneously display identity information of more than one PTT speakers.

20. The apparatus of claim 15, wherein the means for displaying identity information, when displaying identity information of two or more PTT speakers, is configured to indicate identity information of a last PTT speaker.

21. A computer-readable medium on which is stored a computer program for displaying the identity of a last speaker in push-to-talk (PTT) communications on a wireless telecommunication network, the computer program comprising computer instructions that when executed by a computer performs the steps of:
receiving a first identity information of a first speaker of a first PTT communication from a server, the first identity information being received through the wireless telecommunication network;
receiving a second PTT communication originated from a second speaker; playing the second PTT communication on a wireless communication device; and displaying the first identity information on the wireless communication device.

22. The computer readable medium of claim 21, wherein the first identity information is displayed for a predefined period.

23. The computer readable medium of claim 22, further performing the steps of: receiving from a user an indication of a time period for the predefined period; and storing the indication of the time period in the wireless communication device.

24. The computer readable medium of claim 23, further performing the step of retrieving the indication of the time period from the wireless communication device.

25. The computer readable medium of claim 21, further performing the step of activating a recall key to display the first identity information.

26. The computer readable medium of claim 21, further performing the step of, if a second identity information of the second speaker is received while the first identity information is displayed, displaying the first identity information and the second identity information on the wireless communication device.

27. The computer readable medium of claim 26, further performing the step of displaying an indicator identifying the first identity information as belonging to the first speaker.

28. The computer readable medium of claim 26, further performing the step of displaying an indicator identifying the second identity information as belonging to the second speaker.

* * * * *